United States Patent [19]

Thrasher

[11] 4,193,873
[45] Mar. 18, 1980

[54] MANURE COLLECTION AND STORAGE SYSTEM

[76] Inventor: Donald D. Thrasher, Rte. No. 1, North Manchester, Ind. 46962

[21] Appl. No.: 910,693

[22] Filed: May 30, 1978

[51] Int. Cl.² .............................................. A01K 1/00
[52] U.S. Cl. .................................. 210/170; 210/180; 210/262; 119/28; 210/195.1; 210/257.1
[58] Field of Search ...................... 210/14, 167, 12, 3, 210/8, 15, 10, 195–197, 170, 179, 73 S, 175, 180, 182, 200–202, 218, 252, 262, 257 R; 119/16, 22, 28; 71/21, 64 C

[56] References Cited

U.S. PATENT DOCUMENTS

| | | | |
|---|---|---|---|
| 3,271,304 | 9/1966 | Valdespino et al. | 210/14 |
| 3,840,457 | 10/1974 | Wilson | 210/15 |
| 3,927,644 | 12/1975 | Nafziger | 210/167 |
| 4,121,539 | 10/1978 | Moore | 119/28 |

FOREIGN PATENT DOCUMENTS

| | | | |
|---|---|---|---|
| 2401964 | 7/1974 | Fed. Rep. of Germany | 210/195 S |
| 2241500 | 3/1975 | France | 210/197 |
| 1320293 | 6/1973 | United Kingdom | 119/16 |

*Primary Examiner*—Benoit Castel
*Attorney, Agent, or Firm*—Gust, Irish, Jeffers & Rickert

[57] ABSTRACT

A manure collection and storage system includes a collecting receptacle for receiving manure collected from an animal confining facility, and a water line for adding water to the manure in the collecting receptacle to form a slurry. A storage receptacle is located at a distance from the collecting receptacle and is connected thereto by a conduit. A first pump is coupled in the conduit for transferring slurry from the collecting receptacle to the storage receptacle. A second pump is coupled to the storage receptacle for recirculating the slurry therein thereby to agitate the same, the second pump being adapted to discharge slurry from the second receptacle.

11 Claims, 9 Drawing Figures

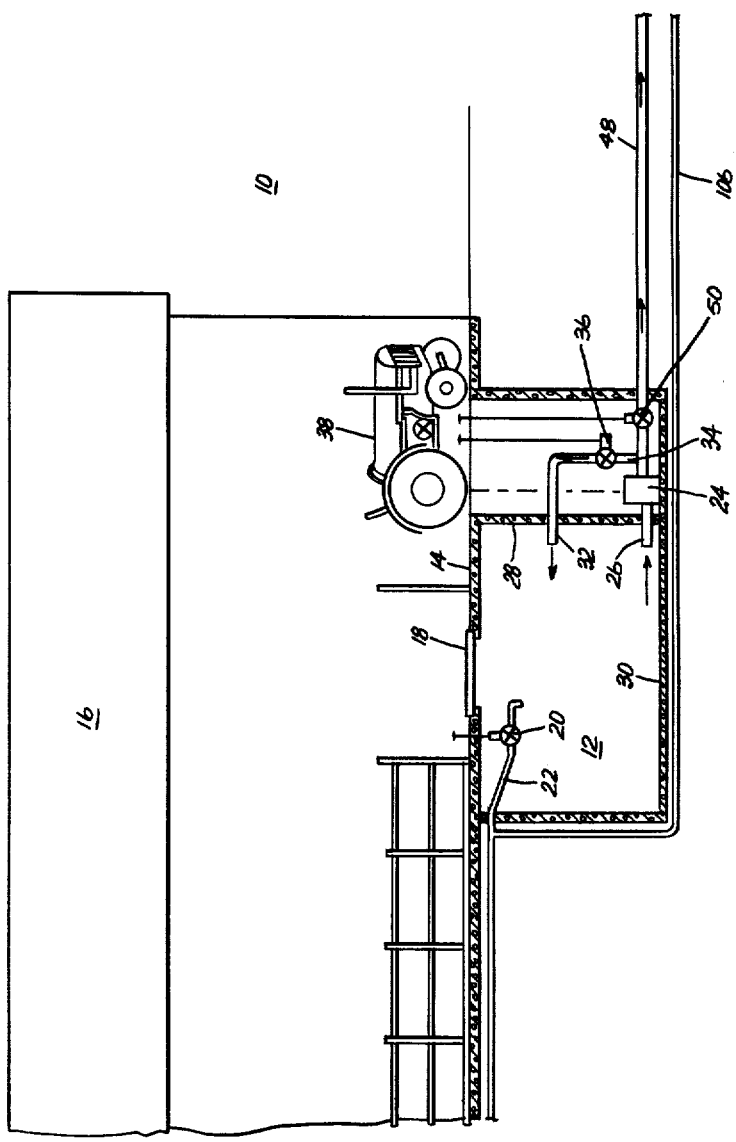

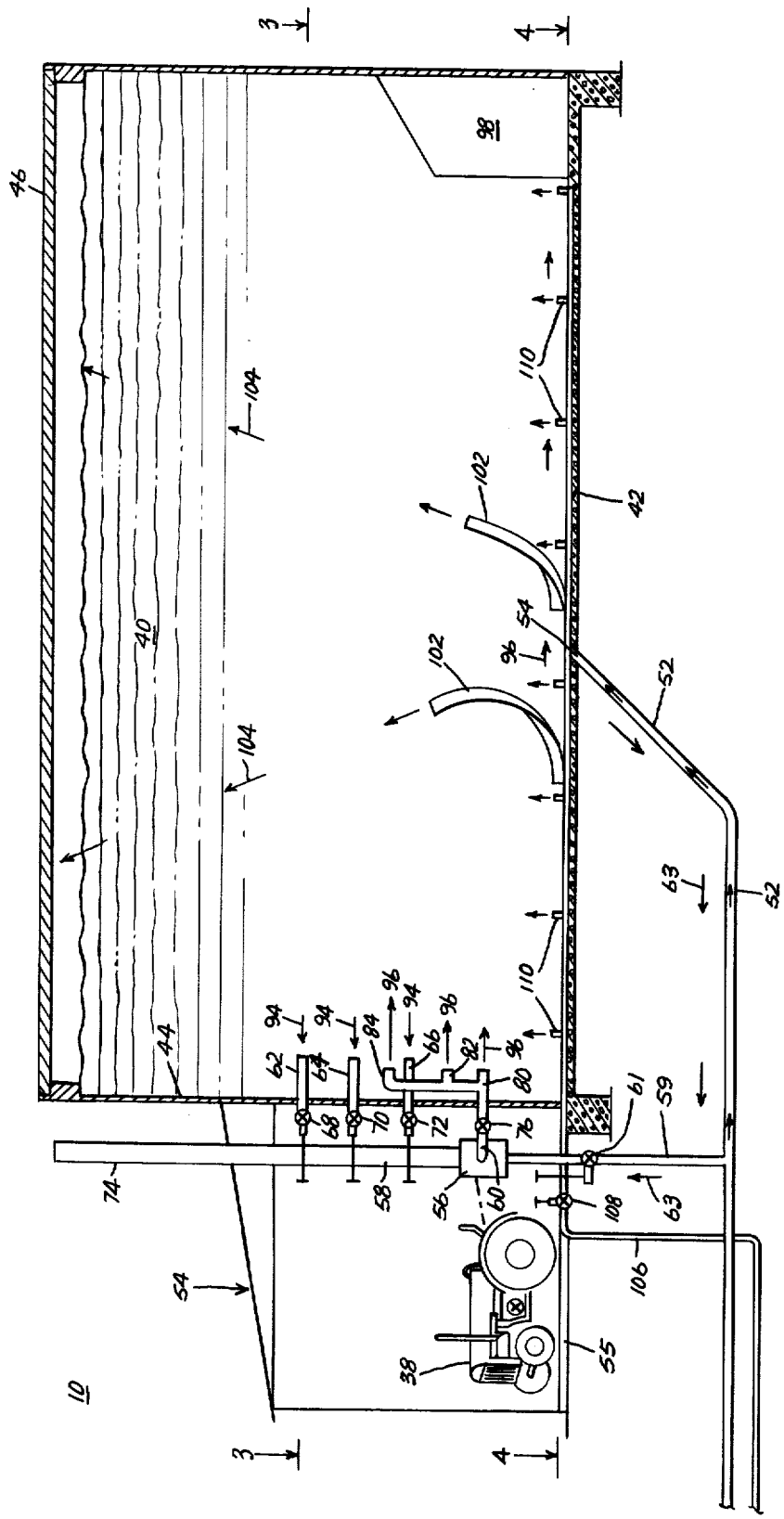

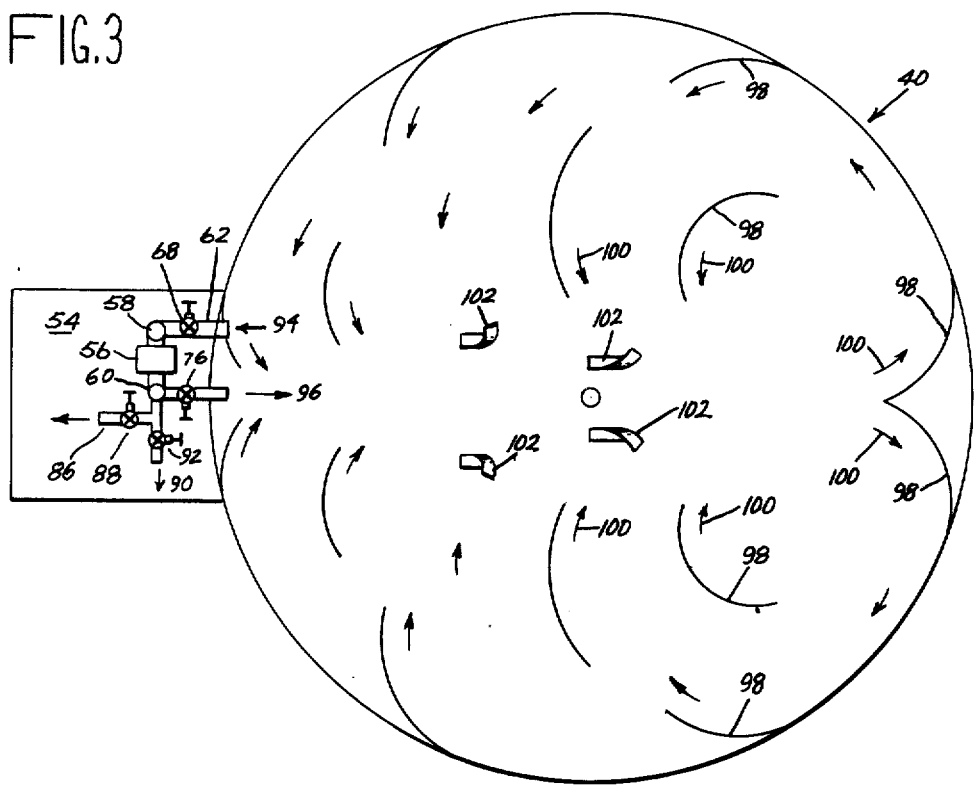
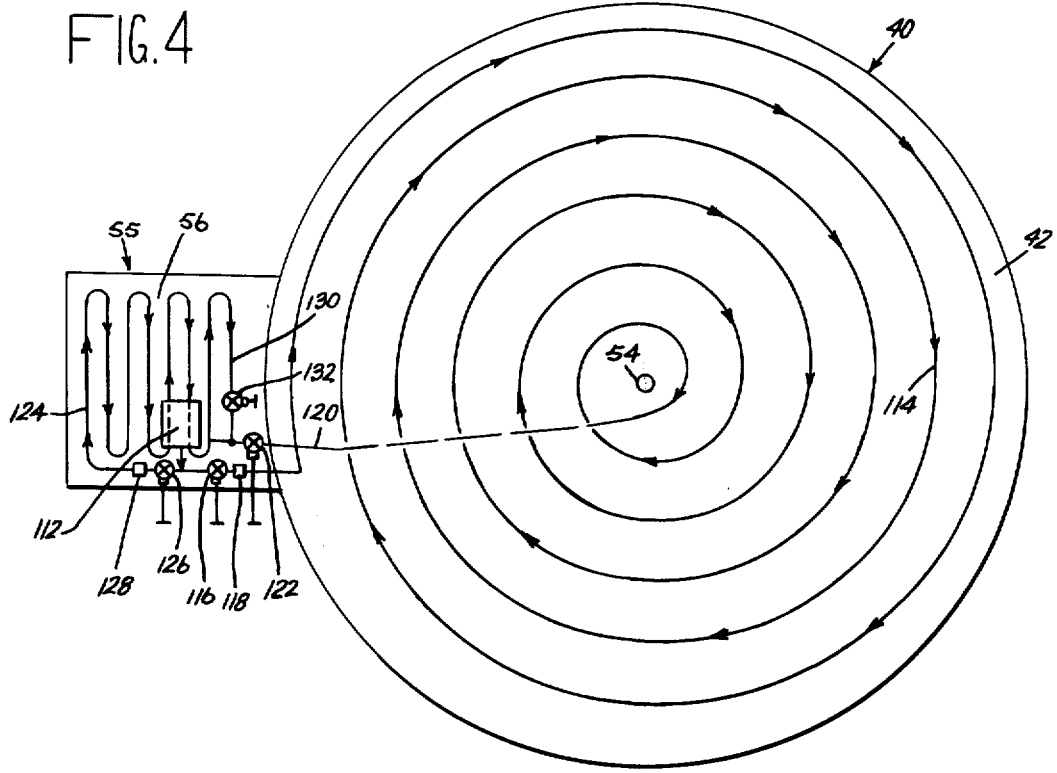

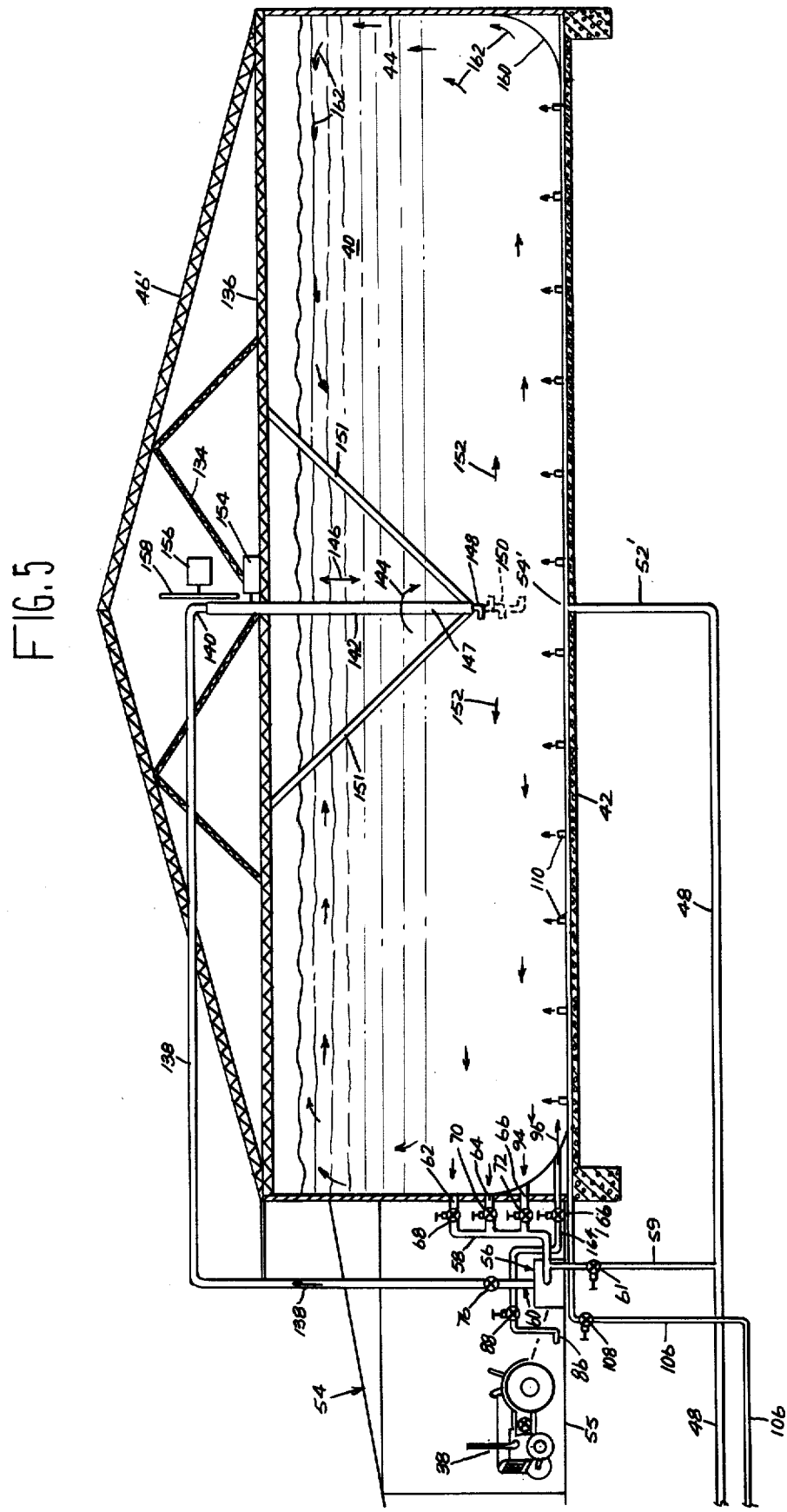

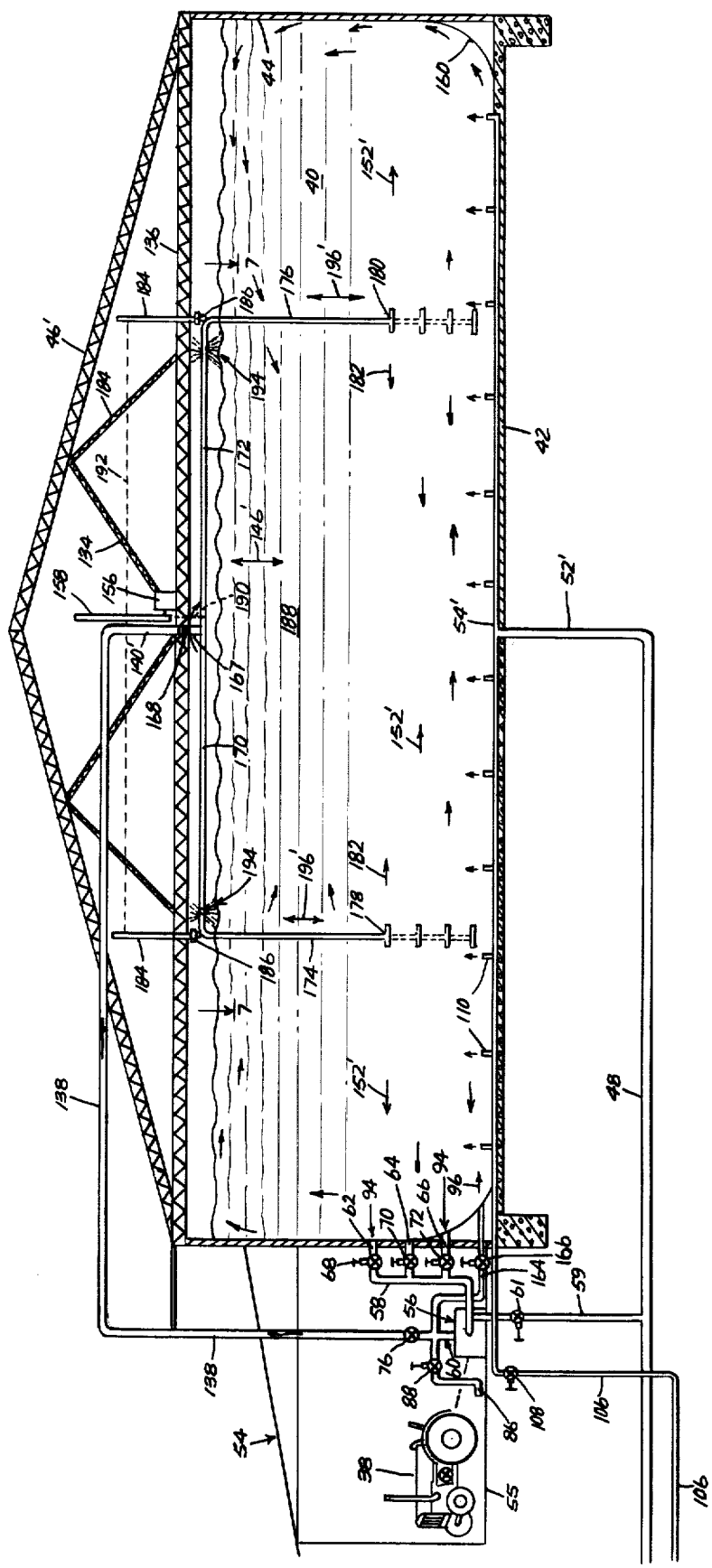

MANURE COLLECTION AND STORAGE SYSTEM

BACKGROUND OF THE INVENTION

1. Field of the Invention

This invention relates generally to manure collection and storage systems, and more particularly to such a system in which the water and manure slurry in the storage receptacle is recirculated by pumping to agitate the same.

2. Description of the Prior Art

Systems have been provided in which manure is collected from an animal confinement facility, water is added thereto to form a slurry, and the slurry is stored for later removal, i.e., to be spread upon a field for fertilizing purposes or transported elsewhere. A crust normally forms on the top of the slurry in the storage receptacle and it is desirable to maintain this crust until such time as the slurry is to be removed in order to retain the nutrients in the slurry and to eliminate odors. At the time of removal of the slurry, however, the slurry must be agitated to break up the crust. In prior systems known to the applicant, agitation of the slurry in the storage receptacle has been accomplished by mechanical agitators of various types; however, such mechanical agitation has not been completely effective and further, adds appreciably to the overall cost of the system.

SUMMARY OF THE INVENTION

The apparatus of the invention, in its broader aspects, comprises a first collecting receptacle for receiving manure collected from an animal confining facility, and means for selectively feeding water to the first receptacle to form a slurry of the manure therein. A first pump has an intake coupled to the first receptacle for withdrawing slurry therefrom and has a discharge. A second storage receptacle is provided remote from the first receptacle, and first means are provided for selectively coupling the first pump discharge to the second receptacle thereby to transfer slurry thereto from the first receptacle. A second pump is provided having an intake and a discharge, and second means is provided for coupling the second receptacle to the second pump intake for withdrawing slurry therefrom. Third means is provided for selectively coupling the second pump discharge to the second receptacle thereby to return slurry thereto to agitate the slurry therein, and fourth means is provided for selectively coupling the second pump discharge to a discharge line thereby to remove slurry from the second receptacle.

It is accordingly an object of the invention to provide an improved system for collecting and storing manure.

Another object of the invention is to provide an improved system for collecting and storing manure wherein a slurry of the manure in a storage receptacle is recirculated therein by pumping in order to agitate the same.

The above-mentioned and other features and objects of this invention and the manner of attaining them will become more apparent and the invention itself will be best understood by reference to the following description of an embodiment of the invention taken in conjunction with the accompanying drawings.

BRIEF DESCRIPTION OF THE DRAWINGS

FIG. 1 is a schematic, side-elevational view, showing the manure collecting part of the system of the invention;

FIG. 2 is a schematic, side-elevational view, showing one embodiment of the slurry storage part of the system of the invention;

FIG. 3 is a top schematic view of the system shown in FIG. 2 taken generally along the line 3—3 thereof;

FIG. 4 is a schematic top view showing the system for heating the slurry in the storage receptacle of FIG. 2 taken generally along the line 4—4 thereof;

FIG. 5 is a schematic, side-elevational view, showing another embodiment of the slurry storage part of the system of the invention;

FIG. 6 is a schematic, side-elevational view, showing a further embodiment of the slurry storage part of the system of the invention;

FIG. 7 is a top-cross sectional view of a modification of the embodiment of FIG. 6 taken generally along the line 7—7 of FIG. 6;

DESCRIPTION OF THE PREFERRED EMBODIMENTS

Figure 9:
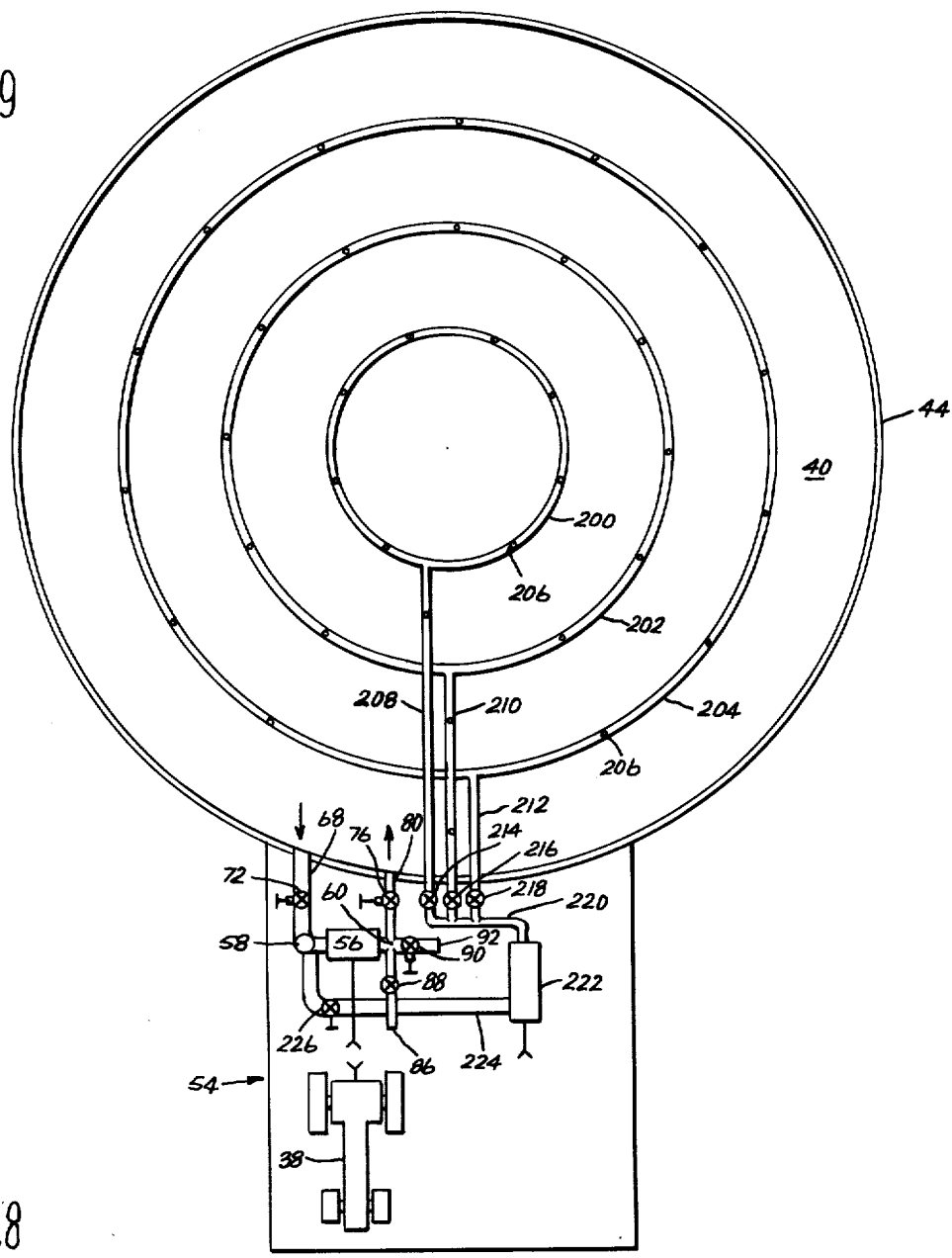
FIG. 9 is a top schematic view showing a further slurry agitating system which can be employed in any embodiment of the slurry storage system of the invention.

Referring now to FIGS. 1-4 of the drawings, one embodiment of the improved manure collecting and storage system of the invention, generally indicated at 10 in FIGS. 1 and 2, includes a manure collecting receptacle or pit 12 located beneath floor 14 of animal confining facility 16, and communicating therewith by means of slatted grating 18. Water may be added to the manure in collecting receptacle 12, as needed, to form a slurry thereof by means of valve 20 in water line 22.

Pump 24 has its intake 26 extending into collecting pit 12 through wall 28 adjacent bottom 30 thereof. Line 32 couples discharge 34 of pump 24 to collecting pit 12 through side wall 28 and has valve 36 therein, line 32 being at a level above the level of intake 26 of pump 24.

Pump 24 may be driven by a hydraulic motor coupled to be powered by the power take-off of conventional farm tractor 38. Alternatively, pump 24 may be powered by a suitable electric motor, or by a stationary gasoline engine. It will now be seen that the manure and water in collecting pit 12 may be recirculated by pump 24 thereby to agitate the same to form a slurry.

Slurry storage receptacle or tank 40 (FIG. 2) preferably is located at a distance from animal confinement facility 16 and manure collecting pit 12 (FIG. 1), and preferably is located above ground, as shown. Storage tank 40 comprises bottom 42, preferably in the form of a concrete slab, and cylindrical side wall 44 (FIG. 3), and top wall 46, preferably formed of glass-coated steel.

Conduit 48 couples pump 24 to storage tank 40 and has valve 50 therein. Conduit 48 has section 52 which is inclined upwardly and communicates with the interior of storage tank 40 generally at the center thereof, as at 54. It will now be seen that with valve 36 open and valve 50 closed, pump 24 recirculates water and manure in collecting pit 12 to form the slurry, and that with valve 36 closed and valve 50 open, pump 24 transfers the slurry from collecting pit 12 to storage tank 40, as shown by arrows 52.

Equipment shed 54 may be located on one outer side of side wall 44 of bin 40 on an extension 55 of bottom slab 42. Pump 56 is located in equipment shed 54 and has intake conduit 58 and discharge conduit 60. Intake conduit 58 is coupled to the interior of storage tank 40 by lines 62, 64, 66 which extend through side wall 44 and respectively have valves 68, 70, 72 therein. Intake conduit 58 extends upwardly to form vent 74. Discharge conduit 60 has valve 76 therein and is coupled to the interior of storage tank 40 by lines 80, 82, 84 extending through side wall 44. It will be observed that the lowermost discharge line 80 of pump 56 is at a level adjacent bottom 42 of storage tank 40 whereas the lowermost intake line 66 is at a higher level, and that the uppermost discharge line 84 is at a lower level than the uppermost intake line 62. Reference to FIG. 3 will reveal that intake lines 62, 64, 66 and discharge lines 80, 82, 84 are horizontally displaced in their respective levels.

Discharge conduit 60 of pump 56 is also connected to discharge line 86 having valve 88 therein and adapted to discharge slurry from storage tank 40 to a spreader or other vehicular container, and discharge conduit 60 may further be connected to another discharge line 90 having valve 92 therein adapted to be coupled to an irrigation system. Intake conduit 58 has one additional intake line 59 coupled thereto having valve 61 therein and coupled to conduit 48. Thus, with all valves closed other than valves 61 and 88 or 92, pump 56 may be operated completely to empty tank 40, as shown by arrows 63.

It will now be seen that with valves 88, 92 closed and with valves 68, 70, 72 and 76 open, slurry in storage tank 40 will be withdrawn therefrom by pump 56, as shown by arrows 94 and discharged back into storage tank 40, as shown by arrows 96, thereby recirculating the slurry in tank 40 to agitate the same. In order to aid in recirculation of the slurry, curved baffle members 98 are mounted on bottom 42 of storage tank 40 and serve to deflect the slurry discharged into tank 40 by pump 56 in divergent swirling paths, as shown by arrows 100. Further, baffles 102 also mounted on bottom 42 of storage tank 40 serve further to deflect the slurry discharged into tank 40 by pump 56 in upward paths toward top wall 46, as shown by arrows 104, the combined action of baffles 98, 102 serving to assist in the agitation of the slurry in storage tank 40. It will be observed that section 52 of conduit 48 is inclined upwardly in the direction away from pump 56.

As in the case of pump 24, pump 56 may be driven by a suitable hydraulic motor coupled to the power take-off of tractor 38 or, alternatively, may be powered by a suitable electric motor, or by a stationary gasoline engine. It may be desirable to add further water to the slurry in storage tank 40 and for that purpose, water line 22 has an extension 106 having valve 108 therein for selectively feeding water to tank 40 through water inlets 110.

Referring now to FIG. 4 of the drawings, it may be desirable to heat the slurry in storage tank 40 in order to prevent freezing and to accelerate bacterial growth. For this purpose, a suitable hot water boiler 112 is located in equipment shed 54 and is coupled to piping 114 embedded in bottom slab 42 by valve 116 and circulating pump 118. Return line 120 from piping 114 is coupled to boiler 112 by valve 122. It may also be desirable to heat equipment shed 54 and for that purpose, boiler 112 is also coupled to piping 124 embedded in slab extension 55 by valve 126 and circulating pump 128, and return line 130 is coupled back to boiler 112 by valve 132. The slurry in storage tank 40 is preferably maintained at a temperature of about 50° to 70° F. by hot water boiler 112 and piping system 114.

Referring now to FIG. 5 in which like elements are indicated by like reference numerals and similar elements by primed reference numerals, in this embodiment, section 52' of conduit 48 extends vertically upwardly to communicate with the interior of tank 40 through bottom wall 42, as at 54'. Storage tank 40 has conical roof 46' supported by suitable truss member 134, 136.

Discharge conduit 60 of pump 56, with valve 76 therein, has extension section 138 which extends upwardly beside side wall 44 and then horizontally through roof 46' to generally the center thereof, and then downwardly, as at 140. Discharge conduit section 142 is connected to end 140 of conduit section 138 for rotatable and vertical movement with respect thereto, as shown at 144, 146, respectively. Discharge nozzle 148 is affixed to lower end 147 of conduit section 142, faces side wall 44, and is vertically movable and rotatable with conduit section 142, as shown in dashed lines at 150. Thus, slurry discharged by pump 56 is returned to tank 40 by conduit sections 138, 140, 142 and discharge nozzle 148, as shown by arrows 152.

Conduit section 142 and discharge nozzle 148 may be rotated by suitable electric drive motor 154, and conduit section 142 and discharge nozzle 148 are selectively raised and lowered by another suitable electric motor 156 driving conventional rack and pinion mechanism 158. Drive motors 154, 156 and rack and pinion mechanism 158 may be supported on truss members 136. Suitable stablizer members 151 support and guis lower end 147 of discharge conduit section 142 for vertical and rotational movement. Motor 154 preferably drives rotatable conduit section 142 and discharge nozzle 148 at a relatively slow speed, such as about one (1) rpm.

Curved baffle 160 extends between bottom wall 42 and side wall 44 of tank 40 and serves to deflect the slurry discharged by discharge nozzle 148 upwardly thereby to recirculate the same, as shown by arrows 162. Another discharge line 164, having valve 166 therein, is connected to discharge conduit 60 of pump 56 and extends through side wall 44 adjacent bottom 42.

In this embodiment, intake 58 of pump 56 is again coupled to intake lines 62, 64, 66, which extend through side wall 44 into tank 40, by valves 68, 70, 72, and discharge conduit 60 is again coupled to discharge line 86 by valve 88, and may also be coupled to discharge line 90 by line 92, as shown in FIG. 3. Water line 106 is again coupled by valve 108 to supply water to the interior of tank 40 by water lines 110 in bottom slab 42.

Referring now to FIG. 6 in which like elements are again indicated by like reference numerals and similar elements by primed reference numerals, this embodiment differs from the embodiment shown in FIG. 5, and described above, only in the respect that downwardly extending discharge conduit section 140' is coupled to another downwardly extending section 167 by vertically adjustable, rotatable coupling 168. Branch discharge line sections 170, 172 extend horizontally outwardly in opposite directions from section 166 and have downwardly extending sections 174, 176 which respectively terminate in discharge nozzles 178, 180. Discharge nozzles 178, 180 respectively discharge slurry in opposite directions, as shown by arrows 152', 182, direction 152' being outwardly toward side wall 44 and direction 182 being inwardly toward the center of tank 40.

Guides 184 support circular track 186 which, in turn, supports and guides revolving agitator assembly 188 comprising branch lines 170, 172, depending lines 174, 176, and discharge nozzles 178, 180 for rotary and vertical movement. Drive motor 156 and rack mechanism 158 supported on truss member 136 is coupled to raise and lower agitator assembly 188, as shown by arrows 146', as shown in dashed lines at 190, 192. Revolving agitator assembly 188 is caused to rotate by means of slurry jets 194 on opposite sides of the outer extremities of branch lines 170, 172.

Referring briefly to FIG. 7, revolving agitator assembly 188 may also be caused to rotate by providing discharge nozzles 178', 180' at the lower ends of lines 174, 176 which discharge slurry outwardly in opposite directions, as shown by arrows 196.

Figure 8:
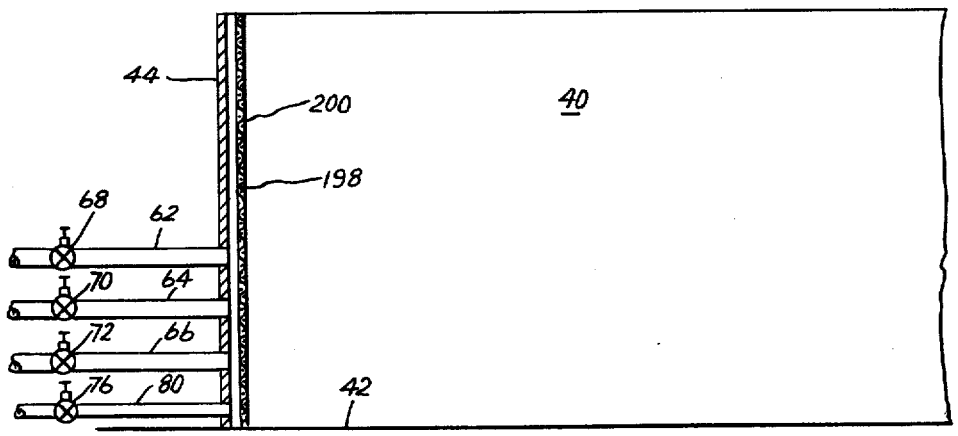
FIG. 8 is a fragmentary, side cross-sectional view showing a screen which may be employed in any embodiment of the slurry storage part of the system of the invention.

Referring now to FIG. 8, it will be seen that a suitable screen 198, such as an aluminum screen having a three-inch mesh, supported in suitable channels 200 mounted on side wall 44 of tank 40, may cover pump intake or suction lines 62, 64, 66 and discharge line 80, thereby to preclude clogging of those lines by solids.

Referring now to FIG. 9, in order to lift solids upwardly from bottom wall 42 of tank 40 thereby to loosen the same, discharge lines 200, 202, 204, respectively having slurry discharge openings 206 therein may be supported on bottom slab 42, or embedded therein. Discharge lines 200, 202, 204 are respectively coupled by lines 208, 210, 212 and valves 214, 216, 218 to discharge 220 of suitable high pressure pump 222, which may be a multistage turbine pump. Intake 224 of pump 222 is coupled to intake conduit 58 of pump 56 by valve 226. As in the case of pumps 24, 56, pump 222 may be driven by a suitable hydraulic motor powered from the power take-off of tractor 38, or may be driven by a suitable electric motor or stationary gasoline engine.

Alternatively, discharge conduit 60 of pump 56 may be coupled to supply slurry under pressure to discharge lines 200, 202, 204.

It will now be seen that the improved manure collection and storage system and method of the invention provides for the requisite agitation of the slurry in storage tank 40 by recirculation by pumping and resultant pressure without moving parts in the storage bin itself. It has been found desirable to agitate the slurry in storage tank 40 for about four or five hours about twice a year.

While there have been described above the principles of this invention in connection with specific apparatus, it is to be clearly understood that the description is made only by way of example and not as a limitation to the scope of the invention.

What is claimed is:

1. A manure collection and storage system comprising: a first collecting receptacle for receiving manure collected from an animal confining facility; means for selectively feeding water to said first receptacle thereby to form a slurry of the manure therein; a first pump having an intake coupled to said first receptacle for withdrawing slurry therefrom and having a discharge; a second storage receptacle remote from said first receptacle; first means for selectively coupling said first pump discharge to said second receptacle thereby to transfer slurry thereto from said first receptacle; a second pump having an intake and a discharge, second means for coupling said second receptacle to said second pump intake for withdrawing slurry therefrom; third means for selectively coupling said second pump discharge to said second receptacle thereby to return slurry thereto to agitate the slurry therein; and fourth means for selectively coupling said second pump discharge to a discharge line thereby to remove slurry from said second receptacle;

said second receptacle has a bottom and a side wall, said first means being coupled to said second receptacle through said bottom, said third means being coupled to said second receptacle through said side wall at least at a first level adjacent said bottom, said second means being coupled through said side wall at least at said second level spaced above said first level;

said second and third means are coupled to said second receptacle through said side wall at horizontally displaced points in the respective second and first levels;

said third means is also coupled to said second receptacle through said side wall at least at one other level above said first level, and said second means is also coupled to said second receptacle through said side wall at least at one other level above said second level.

2. A manure collection and storage system comprising: a first collecting receptacle for receiving manure collected from an animal confining facility; means for selectively feeding water to said first receptacle thereby to form a slurry of the manure therein; a first pump having an intake coupled to said first receptacle for withdrawing slurry therefrom and having a discharge; a second storage receptacle remote from said first receptacle; first means for selectively coupling said first pump discharge to said second receptacle thereby to transfer slurry thereto from said first receptacle; a second pump having an intake and a discharge, second means for coupling said second receptacle to said second pump intake for withdrawing slurry therefrom; third means for selectively coupling said second pump discharge to said second receptacle thereby to return slurry thereto to agitate the slurry therein; and fourth means for selectively coupling said second pump discharge to a discharge line thereby to remove slurry from said second receptacle;

said second receptacle has a bottom and a side wall, said first means being coupled to said second receptacle through said bottom, said third means being coupled to said second receptacle through said side wall at least at a first level adjacent said bottom, said second means being coupled through said side wall at least at said second level spaced above said first level;

said second receptacle includes a top wall, and further comprising baffle means on said bottom for deflecting the slurry discharged into said second receptacle by said second means toward said top wall thereby to assist the agitation thereof;

said second receptacle side wall is generally cylindrical, and further comprising other baffle means on said bottom for deflecting the slurry discharged into said second receptacle by said second means in divergent swirling paths to assist the agitation thereof;

said first means includes a conduit having a section communicating with said second receptacle through said bottom generally at the center thereof, said conduit section being inclined with respect to said bottom in a direction away from said second and third means;

said third means is also coupled to said second receptacle through said side wall at least at one other level above said first level, and said second means is also coupled to said second receptacle through said side wall at least at one other level above said second level, said second and third means being coupled to said second receptacle through said side wall at horizontally displaced points in the respective levels.

3. A manure collection and storage system comprising: a first collecting receptacle for receiving manure collected from an animal confining acility; means for selectively feeding water to said first receptacle thereby to form a slurry of the manure therein; a first pump having an intake coupled to said first receptacle for withdrawing slurry therefrom and having a discharge; a second storage receptacle remote from said first receptacle; first means for selectively coupling said first pump discharge to said second receptacle thereby to transfer slurry thereto from said first receptacle; a second pump having an intake and a discharge, second means for coupling said second receptacle to said second pump intake for withdrawing slurry therefrom; third means for selectively coupling said second pump discharge to said second receptacle thereby to return slurry thereto to agitate the slurry therein; and fourth means for selectively coupling said second pump discharge to a discharge line thereby to remove slurry from said second receptacle;

said first receptacle is located beneath said facility and said second receptacle is substantially above ground level, said first receptacle having a bottom and a side wall, said second receptacle having a bottom, a generally cylindrical side wall and a top wall, said first pump intake being coupled to said first receptacle through said side wall thereof adjacent said bottom thereof, said third means being coupled to said second receptacle through said side wall thereof at least a first level adjacent said bottom thereof and said second means being coupled to said second receptacle through said side wall thereof at least at a second level above said first level, said second and third means being coupled to said second receptacle at horizontally displaced points in the respective second and first levels, said first means including a conduit having a section communicating with said second receptacle through said bottom generally at the center thereof, said conduit section being inclined with respect to said bottom in a direction away from said second and third means; and further comprising fifth means for selectively coupling said first pump discharge to said first receptacle through said side wall thereof above said first pump intake; said first through fifth means respectively including selectively actuatable valves; first baffle means on said second receptacle bottom for deflecting the slurry discharged into said second receptacle by said second means in divergent swirling paths, and second baffle means on said second receptacle bottom for deflecting said slurry discharged by said second means toward said top wall thereby to assist the agitation thereof, and means for selectively feeding water to said second receptacle thereby further to liquify the slurry therein.

4. A manure collection and storage system comprising: a first collecting receptacle for receiving manure collected from an animal confining facility; means for selectively feeding water to said first receptacle thereby to form a slurry of the manure therein; a first pump having an intake coupled to said first receptacle for withdrawing slurry therefrom and having a discharge; a second storage receptacle remote from said first receptacle; first means for selectively coupling said first pump discharge to said second receptacle thereby to transfer slurry thereto from said first receptacle; a second pump having an intake and a discharge, second means for coupling said second receptacle to said second pump intake for withdrawing slurry therefrom; third means for selectively coupling said second pump discharge to said second receptacle thereby to return slurry thereto to agitate the slurry therein; and fourth means for selectively coupling said second pump discharge to a discharge line thereby to remove slurry from said second receptacle;

said second receptacle has an upper end, said third means including a conduit having a section extending downwardly into said second receptacle through said upper end, said conduit section having at least one discharge end for discharging slurry from said second pump into said second receptacle;

said second receptacle has a side wall, said discharge end generally facing said side wall, a further comprising means for rotating said discharge end;

means for selectively raising and lowering said discharge end.

5. The apparatus of claim 4 wherein said second receptacle has a bottom, said side wall being generally cylindrical, said first means being coupled to said second receptacle through said bottom, and further comprising baffle means extending between said bottom and side wall for deflecting slurry discharged by said discharge end toward said upper end of said second receptacle.

6. A manure collection and storage system comprising: a first collecting receptacle for receiving manure collected from an animal confining facility; means for selectively feeding water to said first receptacle thereby to form a slurry of the manure therein; a first pump having an intake coupled to said first receptacle for withdrawing slurry therefrom and having a discharge; a second storage receptacle remote from said first receptacle; first means for selectively coupling said first pump discharge to said second receptacle thereby to transfer slurry thereto from said first receptacle; a second pump having an intake and a discharge, second means for coupling said second receptacle to said second pump intake for withdrawing slurry therefrom; third means for selectively coupling said second pump discharge to said second receptacle thereby to return slurry thereto to agitate the slurry therein; and fourth means for selectively coupling said second pump discharge to a discharge line thereby to remove slurry from said second receptacle;

said second receptacle has an upper end, said third means including a conduit having a section extending downwardly into said second receptacle through said upper end, said conduit section having at least one discharge end for discharging slurry from said second pump into said second receptacle;

said conduit section has at least two branches respectively extending generally radially in opposite directions, each said branch having a downwardly depending portion terminating in said discharge end.

7. The apparatus of claim 6 wherein said second receptacle has a side wall, said discharge ends generally facing said side wall, and further comprising means for rotating said branches.

8. The apparatus of claim 7 wherein said rotating means comprises slurry-projecting jets on said branches.

9. The apparatus of claim 7 further comprising means for raising and lowering said branches.

10. The apparatus of claim 7 further comprising additional discharge ends on said depending portions of said branches and respectively, generally facing each other.

11. The apparatus of claim 7 wherein said rotating means comprises said discharge ends being respectively disposed at angles with respect to a plane including said depending portions of said branches.

* * * * *